Patented July 29, 1941

2,251,234

UNITED STATES PATENT OFFICE 2,251,234

PROCESS AND PRODUCT FOR REMOVING ANIONS

Robert C. Swain, Riverside, Conn., assignor to American Cyanamid Company, New York, N. Y., a corporation of Maine No Drawing. Application December 6, 1940, Serial No. 368,855

8 Claims. (Cl. 210—24)

This invention relates to anion-active materials and to the extraction of anions from fluid media.

An object of this invention is to provide a process for the removal of anions from fluid media and particularly from aqueous solutions.

Another object of this invention is to provide a substantially insoluble resin having a relatively high anion capacity for carrying out the foregoing object.

These and other objects are attained by bringing a fluid containing anions into contact with a biguanide-formaldehyde condensation product which is insolubilized with a urea-aldehyde condensation product or an aminotriazine-aldehyde condensation product.

The following examples in which the proportions are in parts by weight are given by way of illustration and not in limitation.

Example 1

| | Parts |
|---|---|
| Urea (½ mol) | 30 |
| Biguanide nitrate (¼ mol) | 41 |
| Sodium carbonate (0.113 mol) | 12 |
| Formalin (1½ mols) (37% formaldehyde in water) | 122 |

This mixture is charged into a suitable reaction vessel and refluxed on a steam bath, for example, for about 6 hours. About 20 parts of hydrochloric acid (18% HCl in water) are added to the resulting solution which is maintained at about 70–85° C. The gel thus formed is ground to a convenient size, such as about the size of a pea, and dried for 5 hours at about 50–60° C. The dried product is ground and screened so that the bulk of the material goes through 24 mesh and remains on 30 mesh screens. The ground material may be thoroughly washed with dilute alkali followed by water, preferably distilled water, and it is then dried to substantially constant weight at any suitable temperature, for example, 110° C. The packed density of the product is about 27.7 pounds per cubic foot.

A filter bed is prepared by filling a cylinder with the material prepared above which has been wet with water. Water containing a relatively low concentration of hydrochloric acid (e. g., 0.01%) is passed through the bed slowly. The effluent remains approximately neutral and there is no test for chloride ions until the bed is exhausted. At this point the bed has absorbed acid, the equivalent of about 8500 grains of calcium carbonate per cubic foot of resin. This value is generally designated as the capacity of the active material.

After the bed is exhausted it may be regenerated by washing with a dilute alkali, e. g., a 2% solution of sodium carbonate, followed by distilled water and the bed is then ready for another cycle. During the second cycle the bed retains its capacity equivalent to about 8500 grains of calcium carbonate per cubic foot and in subsequent cycles, this value does not change very rapidly.

Example 2

| | Parts |
|---|---|
| Urea (⅔ mol) | 40 |
| Biguanide neutral sulfate (⅛ mol) | 37.5 |
| Sodium carbonate | 12 |
| Formalin (1½ mols) (37% formaldehyde in water) | 122 |

This mixture is charged into a suitable reaction vessel provided with an agitator and heated conveniently on a steam bath for about 6 hours at which time about 20 parts of hydrochloric acid (18% solution) are added to the hot solution. The resulting gel is broken up and dried for about 3 hours at around 55° C. and then for 5½ hours at about 100° C. The dried material is ground, screened and further processed according to Example 1. The resulting product has a packed density of about 34.6 pounds per cubic foot and exhibits a capacity equivalent to about 7000 grains of calcium carbonate per cubic foot of resin.

The product made according to this example is suitable for the removal of acid in the same manner as described in Example 1. It may be used not only in the extraction of hydrochloric acid but also in the extraction of other mineral acids such as sulfuric acid, mixtures of such acids as hydrochloric and sulfuric acids, organic acids such as acetic acids, oxalic acid, etc.

Example 3

| | Parts |
|---|---|
| Urea (1 mol) | 60 |
| Biguanide neutral sulfate (¼ mol) | 75 |
| Sodium carbonate | 24 |
| Formalin (3 mols) (37% formaldehyde in water) | 243 |

These substances are reacted in the same general manner as described in Example 1 by refluxing for about 6 hours followed by the addition of 60 parts of hydrochloric acid (18% solution) to the hot solution. The resulting gel is ground and dried for about 3 hours at around 55° C. and then for 4 hours at about 100° C. The dried material is further processed as described in Example 1 and the packed density of the ultimate product is found to be about 25.4 pounds per cubic foot and the material has a capacity for the extraction of acids equivalent to about 10,000 grains of calcium carbonate per cubic foot.

*Example 4*

| | Parts |
|---|---|
| Urea (½ mol) | 30 |
| Biguanide nitrate (¼ mol) | 41 |
| Sodium carbonate | 12 |
| Formalin (1½ mols) (37% formaldehyde in water) | 122 |

These substances are reacted in the same general manner as described in Example 1 by refluxing for about 6 hours followed by the addition of 20 parts of hydrochloric acid (18% solution) to the hot solution. The resulting gel is ground and dried for about 4 hours at around 50–55° C. and then for about 4 hours at around 100° C. The dried material is further processed as described in Example 1 and the packed density of the ultimate product is found to be about 23 pounds per cubic foot and the material has a capacity for the extraction of acids equivalent to about 11,000 grains of calcium carbonate per cubic foot.

*Example 5*

| | Parts |
|---|---|
| Urea (1 mol) | 60 |
| Biguanide neutral sulfate (¼ mol) | 75 |
| Sodium carbonate | 24 |
| Formalin (2½ mols) (37% formaldehyde in water) | 202 |

These substances are reacted in the same general manner as described in Example 1 by refluxing for about 6 hours followed by the addition of 60 parts of hydrochloric acid (18% solution) to the hot solution. The resulting gel is ground and dried for about 24 hours at room temperature and then for 3½ hours at around 55° C. and then for 4 hours at about 100° C. The dried material is further processed as described in Example 1 and the packed density of the ultimate product is found to be about 22.5 pounds per cubic foot and the material has a capacity for the extraction of acids equivalent to about 9000 grains of calcium carbonate per cubic foot.

*Example 6*

| | Parts |
|---|---|
| Urea (1 mol) | 60 |
| Biguanide neutral sulfate (¼ mol) | 75 |
| Sodium carbonate | 24 |
| Formalin (3 mols) (37% formaldehyde in water) | 243 |
| Water | 150 |

These substances are reacted in the same general manner as described in Example 1 by refluxing for about 6½ hours followed by the addition of 60 parts of hydrochloric acid (18% solution) to the hot solution. The resulting gel is ground and dried for about 4 hours at around 55° C. and then for 4½ hours at about 100° C. The dried material is further processed as described in Example 1 and the packed density of the ultimate product is found to be about 23.1 pounds per cubic foot and the material has a capacity for the extraction of acids equivalent to about 7500 grains of calcium carbonate per cubic foot.

*Example 7*

| | Parts |
|---|---|
| Biguanide (free base) (¼ mol) | 26 |
| Urea (½ mol) | 30 |
| Formalin (1½ mols) (37% formaldehyde in water) | 122 |

The biguanide is added to the formalin with the evolution of heat, thereby producing a light yellow solution. The urea is added and heated to reflux on a steam bath. The solution sets to a rubbery mass in about 5 minutes. This material is broken up and dried at 55° C. for 3½ hours and then at 100° C. for 4½ hours. The capacity averages about 12,000 grains of calcium carbonate per cubic foot.

*Example 8*

| | Parts |
|---|---|
| Biguanide neutral sulfate (⅓ mol) | 100 |
| Melamine (⅓ mol) | 42 |
| Formalin (2 mols) (37% formaldehyde in water) | 162 |
| Sodium carbonate | 32 |

The biguanide sulfate, formalin and sodium carbonate are charged into a suitable reaction vessel and heated for 10 minutes, as, for example, by means of a steam bath. The melamine is added and the resulting composition is refluxed for about 6 hours followed by the addition of 50 parts of hydrochloric acid (36% solution) to the hot solution. The resulting solution is allowed to stand overnight during which time a heavy precipitate forms but the solution does not gel. Upon heating the solution to about 90° C. the precipitate dissolves, thereby forming a clear, somewhat viscous solution. To this solution an additional 10 parts of hydrochloric acid (36% solution) are added, thereby quickly producing a gel. The gel is ground up and dried for about 4 hours at around 50° C. and then for about 24 hours at 100° C. The dried material is further processed as described in Example 1 and the packed density of the ultimate product is found to be about 28.3 pounds per cubic foot and it has an initial capacity for the extraction of acids equivalent to about 20,200 grains of calcium carbonate per cubic foot which on a subsequent run drops to about 18,000 grains of calcium carbonate per cubic foot.

*Example 9*

| | Parts |
|---|---|
| Biguanide neutral sulfate (¼ mol) | 75 |
| Melamine (1 mol) | 126 |
| Formalin (3 mols) (37% formaldehyde in water) | 243 |
| Sodium carbonate | 24 |

The biguanide sulfate, formalin and sodium carbonate are charged into a reaction vessel and heated to boiling to give a clear solution. The melamine is added and the solution is refluxed about 1½ hours, thereby producing a slightly turbid viscous solution. 30 parts of hydrochloric acid (36% solution) are added to this solution. The white gel which is formed rapidly is ground and dried for about 4 hours at around 50° C. and then for 24 hours at about 100° C. The dried material is further processed as described in Example 1 and the packed density of the ultimate product is about 21.8 pounds per cubic foot and the material has a capacity for the extraction of acids equivalent to about an average of 8,000 grains of calcium carbonate per cubic foot.

While melamine-formaldehyde resins and urea-formaldehyde resins are generally preferred as the insolubilizing agent, other aminoplastics may be used. Among these are resins produced by condensing an aldehyde, e. g., formaldehyde, acetaldehyde, propionaldehyde, butyraldehyde, cinnamyl aldehyde, furfural, etc., with a urea or an aminotriazine or mixtures thereof. Ureas which may be used include urea itself, thiourea, alkyl ureas, such as ethyl urea, etc. Examples of suitable aminotriazines are: melamine and its derivatives such as 2,4,6-triethyl and triphenyl triamino - 1,3,5 - triazines, 2,4,6 - trihydrazino-1,3,5-triazine, as well as triazines containing 1 or 2 amino groups such as the guanamines, e. g., formoguanamine, lauroguanamine, etc., 2-amino-1,3,5-triazine and their substitution products. Obviously commercial mixtures of the various aminotriazines or mixtures thereof with urea and the like may also be used. One example of such commercial mixtures is the product obtained by heating dicyandiamide sufficiently to obtain a significant amount of melamine, together with other reactive aminotriazine bodies. Phenol-aldehyde condensation products, e. g., phenol- and cresol-formaldehyde condensation products, may also be utilized as insolubilizing media. In some instances it may be desirable to react other substances with formaldehyde in conjunction with the biguanide and the insolubilizing agent, e. g., phenol, aniline, phenylene diamine, dicyandiamide, guanidine and its salts, alkyl and aryl guanidines, etc.

Condensation products may be produced by any suitable process or with any desired combining ratio of aldehyde to the mixture of reactive materials including biguanide and urea, for example. Generally it has been found that the molal ratio of formaldehyde to the reactive materials should preferably not be too high as otherwise good gels are not easily obtainable.

Sufficient ion-active material should be included to provide a material having a substantial ion-active capacity. For this purpose the amount required varies widely with the solubility of the particular ion-active material used, the activity of the concentration of the ionic materials in the fluids to be treated, etc. In general a molal ratio of the biguanide to the other formaldehyde-reactive component such as urea should preferably be between about 1:1 and 1:4, whereas if the latter material is melamine or the like the molal ratio should preferably be between about 3:1 and 1:3.

The biguanide may be used in the form of its salts such as the nitrate and sulfate as indicated in Examples 1-6 and 8-9 or in the form of the free biguanide as shown in Example 7. Furthermore other salts may be used, e. g., the carbonate, acetate, formate, phthalate, benzoate, chloride, etc.

The various aldehyde condensation products are preferably formaldehyde condensation products. Obviously polymers of formaldehyde or substances which yield formaldehyde may be used in place of formaldehyde itself.

My anion-active resins have a capacity for the extraction of anions from fluid media equivalent to about 7,000-20,000 grains of calcium carbonate per cubic foot of resin.

My products are useful for many purposes, examples of which are: water softening, acid removal from water, acid removal from alcohol solutions, etc., purification of sugar juices, etc. My resins are especially suitable for the removal of acids, both organic and inorganic, from aqueous media. Apparently any acid, soluble in water may be separated by means of my resins in the manner described above. Furthermore my resins may be used to extract acids from fluid media other than water and may even be used for the extraction of acids from vapors.

Obviously many modifications and variations in the processes and compositions described above may be made without departing from the spirit and scope of the invention as defined in the appended claims.

I claim:

1. A process of removing anions from fluid media which comprises contacting a substantially insoluble anion-active material including a biguanide-aldehyde condensation product with a fluid medium containing anions.

2. A process of removing anions from fluid media which comprises contacting a substantially insoluble anion-active material including a biguanide-formaldehyde condensation product with a fluid medium containing anions.

3. A process of removing anions from aqueous media which comprises contacting a substantially insoluble anion-active material including a biguanide-formaldehyde condensation product with an aqueous medium containing anions.

4. A material active for the removal of anions from fluid media comprising an insolubilized biguanide-aldehyde condensation product.

5. A material active for the removal of anions from fluid media comprising a biguanide-formaldehyde condensation product insolubilized with a formaldehyde condensation product of a urea.

6. A material active for the removal of anions from fluid media comprising a biguanide-formaldehyde condensation product insolubilized with a formaldehyde condensation product of an aminotriazine.

7. A material active for the removal of anions from fluid media comprising a biguanide-formaldehyde condensation product insolubilized with a formaldehyde condensation product of urea.

8. A material active for the removal of anions from fluid media comprising a biguanide-formaldehyde condensation product insolubilized with a formaldehyde condensation product of melamine.

ROBERT C. SWAIN.